United States Patent
Berger et al.

(10) Patent No.: US 9,212,437 B2
(45) Date of Patent: Dec. 15, 2015

(54) ONE-PIECE FIBER REINFORCEMENT FOR A REINFORCED POLYMER COMBINING ALIGNED AND RANDOM FIBER LAYERS

(75) Inventors: Elisabeth J. Berger, Farmington Hills, MI (US); John N. Owens, Franklin, MI (US); Chen-Shih Wang, Troy, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 13/287,183

(22) Filed: Nov. 2, 2011

(65) Prior Publication Data
US 2013/0108824 A1      May 2, 2013

(51) Int. Cl.
*B32B 5/12*    (2006.01)
*D03D 25/00*   (2006.01)
*D04H 3/00*    (2012.01)
*B32B 5/06*    (2006.01)
*D04H 3/04*    (2012.01)
*D04H 3/002*   (2012.01)
*B29C 70/08*   (2006.01)

(52) U.S. Cl.
CPC ............... *D04H 3/04* (2013.01); *B29C 70/081* (2013.01); *D04H 3/002* (2013.01); *Y10T 428/24124* (2015.01); *Y10T 428/24132* (2015.01); *Y10T 442/3707* (2015.04); *Y10T 442/659* (2015.04)

(58) Field of Classification Search
CPC ...................................................... B29C 70/226

USPC ........................................................... 428/111
See application file for complete search history.

(56) References Cited

U.S. PATENT DOCUMENTS

| | | | | |
|---|---|---|---|---|
| 3,614,936 | A  * | 10/1971 | Philipps ......................... | 112/420 |
| 4,021,593 | A  * | 5/1977  | Smith, II ........................ | 442/402 |
| 4,112,162 | A  * | 9/1978  | Casselbrant .................... | 428/106 |
| 4,278,720 | A  * | 7/1981  | Shannon ......................... | 428/109 |
| 4,342,802 | A  * | 8/1982  | Pickens et al. .................. | 428/92  |
| 4,368,234 | A  * | 1/1983  | Palmer et al. .................. | 428/408 |
| 4,615,717 | A  * | 10/1986 | Neubauer et al. ........... | 428/292.1 |
| 4,692,375 | A  * | 9/1987  | Neubauer et al. ........... | 428/297.4 |
| 5,343,796 | A  * | 9/1994  | Cordova et al. .............. | 89/36.02 |
| 5,809,805 | A  * | 9/1998  | Palmer et al. ................. | 66/84 A  |
| 5,910,458 | A  * | 6/1999  | Beer et al. ...................... | 442/367 |
| 7,794,640 | B2 * | 9/2010  | Healey et al. ................. | 264/258 |
| 2010/0215953 | A1 * | 8/2010 | Boussu et al. ................ | 428/340 |

* cited by examiner

*Primary Examiner* — Aaron Austin
*Assistant Examiner* — Donald M Flores, Jr.
(74) *Attorney, Agent, or Firm* — Reising Ethington P.C.

(57) ABSTRACT

A one-piece fiber reinforcement for a reinforced polymer is described. In an embodiment, a one-piece reinforcement is fabricated by first assembling an interior randomly oriented fiber layer between two exterior aligned fiber layers. With all layers in face to face contact, a preselected number of fibers from the aligned layer is conveyed out of its aligned layer and threaded into at least the random fiber layer so that the conveyed fibers engage and mechanically and frictionally interfere with the random fibers. The fibers may be conveyed from one aligned layer to the other for yet greater interference. The interfering fibers serve to secure and interlock the layers together, producing a one-piece reinforcement which, when impregnated with a polymer precursor, shaped and cured may be incorporated in a polymer reinforced composite article.

12 Claims, 6 Drawing Sheets

ONE-PIECE FIBER REINFORCEMENT FOR A REINFORCED POLYMER COMBINING ALIGNED AND RANDOM FIBER LAYERS

TECHNICAL FIELD

This invention pertains to methods of fabricating a one-piece fiber reinforcement from a number of co-extensive, separate and distinct reinforcing fibrous structures arranged in layered fashion. The method involves intermingling fibers from the different layers so that at least some of the fibers from each layer are inserted into an adjacent layer and bridge the original layer interface to engage with, and interfere with, at least some of the fibers of at least one other layer to interlock the layers. The invention, applied over substantially the entire lateral extent of the individual reinforcements, may be used to fabricate reinforcements with improved resistance to delamination and simplify manufacture of fiber reinforced polymer composites.

BACKGROUND OF THE INVENTION

There is increasing interest in substituting high performance lightweight reinforced composite components and structures comprising a polymer matrix with a suitable reinforcement for stamped sheet metal components in vehicles. Suitable polymers are often thermosets, such as epoxies, vinyl-esters or polyesters, or thermoplastics, such as polypropylene or poly amide, and suitable reinforcements include structural fibers such as carbon, glass or aramid fibers. Such fibers may be randomly oriented and arranged or aligned along one or more preferred directions.

Individual carbon fibers may range from about 5 to 10 micrometers in diameter with 7 micrometer diameter fibers being especially common. Individual glass fibers may range from about 7 to 30 micrometers, depending in part on the grade of glass. In many applications, particularly those employing aligned fibers, assemblages of commonly-oriented fibers, variously called tows or roving, are used. Such carbon fiber assemblages may contain as few as 1000 or as many as 50,000 or more fibers, while glass fiber assemblages may include up to 200,000 or more fibers.

For fabric applications, aligned fibers may be assembled into one of two fabric structures for ease of application: a woven cloth or a non-woven fabric often called a non-crimp or stitch bonded fabric. A woven cloth employs tows of a first orientation which alternately overlie and underlie fiber tows of a second orientation, usually at about 90° to the first orientation. The weave may be tight, with adjacent tows positioned about a millimeter or less apart, or loose, with adjacent tows spaced up to about 10 millimeters apart. In an alternative structure, a number of spaced apart fiber rovings, individually fed from their respective spools, may be simply laid alongside one another in a ply, and temporarily secured and locked into place, by stitching, using, for example, a polyester yarn. Such stitching generally extends over the length and breadth of the reinforcement ply and is usually accomplished with a stitch beam which incorporates a plurality of needles and has a suitable motion to enable both simple chain stitches and other more complex stitches, for example tricot stitches. In many cases multiple coextensive plies are laid atop one another and the rovings of all of the plies are secured in a single stitching operation. Often the plies are placed with the fiber orientations of adjacent plies rotated one from another to render the in-plane properties less directional, or more isotropic, in the multi-ply reinforcement than in each ply individually. The weight of each ply is determined by the bulk of the roving and the spacing between adjacent roving bundles. These, non-woven reinforcements are called stitch bonded fabrics or non crimp fabrics, often abbreviated as NCF.

One common example of a multi-ply NCF is a 4-layer grouping of fibers arranged at 0°, +45°, −45° and 90° respectively with substantially equal numbers of fibers in each orientation. A 2-layer NCF with fibers arranged at +45° and −45° also finds wide application. Of course this description of such a multi-ply NCF is intended to be exemplary and not limiting. It will be appreciated that variations in the number of plies, in the number of orientations, in the angular alignment of the fibers within any ply and in the fiber density in each orientation are comprehended by the terminology non-crimp fabric, stitch bonded fabric, NCF, NCF fabric or aligned fiber layer as used in this specification.

Such fabric reinforcements, woven or non-woven, may be impregnated with a suitable polymer resin, placed in a mold, shaped and then cured, typically at modestly elevated temperature, say about 150° C., to form the desired polymer composite. It will be appreciated that the above-listed sequence of operations may be modified for different molding processes. For example, preforms may be placed in a mold with resin already impregnated, or the resin can be added after the preform is in the mold via resin infusion, resin transfer molding, or structural resin injection molding. Thermoplastic or thermoset sheets or materials with comingled strands of thermoplastic and reinforcing fiber may also be employed.

Commonly, more than one fabric reinforcement may be required to develop the desired properties in the composite. These reinforcements may be stacked atop one another, while possibly rotating or offsetting one layer with respect to another, with the goal of developing greater isotropy, or lack of directionality in properties, at least in the plane of the reinforcement.

Reinforcing layers in which the reinforcing fibers are randomly oriented such as by directed fiber preforming or Programmable Powered Preform Process (P4™ preforming), or one or more layers of continuous strand mat such as Owens Corning 8610 or chopped strand mat also find application. Such reinforcements may, by virtue of the fibers being oriented over all possible orientations, offer more isotropic properties than even a multilayer NCF fabric reinforcement.

One suitable configuration for a multilayer fiber-based polymer composite reinforcement is a layer of randomly-oriented fibers sandwiched between two layers of aligned fibers, which may be assembled as NCF (non crimp fabric) layers or woven layers. But, such multilayer reinforcements are also multi-piece, and require that each reinforcement layer be placed and positioned individually, complicating manufacturing.

There is therefore need for a one-piece reinforcement which facilitates manufacturing of fiber reinforced polymer composite articles and at least meets the performance objective of multilayer, multi-piece reinforcements.

SUMMARY OF THE INVENTION

A layered, one-piece fiber reinforcement suitable for use in a reinforced polymer composite is formed from a plurality of layered, coextensive individual reinforcements in face to face contact. The individual reinforcements may include at least an oriented layer of woven or non-woven reinforcing fabric with oriented fibers and a layer of randomly oriented fibers. A needle punch or similar technique is used to pull or push a preselected portion of the fibers of a layer and insert them into at least an adjacent layer where they may engage with the fibers of the adjacent layer. It is preferred that the fibers engage the layers substantially uniformly over substantially the entire extent of the layer. Frictional interaction and mechanical interference between the fibers from the differing layers will hold, bind and interlock at least adjacent reinforcing layers to one another and render a one-piece reinforcement with enhanced interlayer strength. In reinforcements with more than two layers it may be preferred to thread fibers through all the layers of the reinforcement so that all layers are interlocked. A one-piece reinforcement is thereby effected from a plurality of reinforcing layers. The one-piece reinforcement simplifies manufacturing of fiber reinforced polymer composite articles and provides improved properties over the same arrangement of non-interlocked reinforcing layers.

For example, in an embodiment, a 3-layer reinforcement includes two aligned fiber layers, which may, for example, be NCF layers, with a random fiber layer positioned between them. The random fiber layer may comprise continuous or chopped fibers. A preselected number of fibers from a first aligned fiber layer is pulled or pushed through the random fiber layer and inserted into or through the second aligned fiber layer to frictionally and mechanically securely bind all of the layers together. Optionally, fibers may also be pulled or pushed from the second aligned fiber layer, through the random fiber layer, to the first aligned fiber layer to further secure the layers and effect a one-piece reinforcement. Such extensive fiber rearrangement is not a requirement and fibers may be pulled or pushed from only the random layer to be inserted in one of the aligned layers, or vice versa.

Such a reinforcement, by virtue of those fibers extending out of the plane of reinforcing layer and directed through the reinforcement thickness, will impart enhanced interfacial strength at the layer interfaces to a reinforced polymer article. Such increased interfacial strength may suppress delamination and enhance the energy adsorption afforded by the article under severe loading. This benefit may also obtain with layered chopped strand mat or continuous strand mat reinforcements. Because the location of such load application may be indeterminate, the layers should be bound together over substantially their entire extent with the engaging fibers generally uniformly distributed over the entire area of the layer(s). But it may be preferred to concentrate the engaging fibers at load application sites if these may be predicted, for example by simulation or modeling, or are known from experience or experiment.

Needle punching employs an elongated tool, with a shaft incorporating at least one feature adapted to engage and capture fibers when the tool is moved in a first direction, and, when the tool is moved in the reverse direction, release the captured fibers. The tool, which may be needle-shaped with a diameter of from about 0.5 to 1 millimeter, is operated with a reciprocating motion so that it is repeatedly inserted into, and withdrawn from, a fiber-containing layer. In a tool with a plurality of fiber-capturing features, these will typically be distributed along the length and/or around the cross-section of the tool shaft. Generally the fiber capturing features, for example barbs, hooks or flukes, are arranged for unidirectional fiber capture. That is, a fiber in sliding contact with the tool shaft will be captured and retained by the fiber capturing feature under only one of the tool's reciprocating motions. Often the fiber-capturing feature is oriented to capture fibers as the needle or tool is inserted into a fiber layer so that with each insertion of the tool, fibers captured by the barb(s) or similar, during an early part of the stroke will be pushed more deeply into the fiber layer as the tool continues to advance. At the end of the tool stroke, as the tool reverses direction and is withdrawn, the fiber will disengage from the unidirectional fiber capturing feature but will be held in place through frictional engagement with other fibers or through mechanical interference with other fibers. Because the fiber capturing feature is unidirectional, the tool is ill-oriented and unsuited to capture any further fibers during retraction, and so may be readily withdrawn. Repeated insertions and withdrawals, usually accompanied by lateral movement of the tool to previously unprocessed areas, will promote increasing engagement, entanglement and interference between the fibers from the upper and lower sections of the layer. This procedure may be continued until the layers are secured to one another by a suitable number of inserted fibers across substantially their entire extent. Generally the number of inserted fibers per unit area will be substantially uniform across the extent of the reinforcement but a greater areal density of inserted fibers may be employed in more highly stressed regions if required.

Higher productivity may be achieved through the use of multiple tools, operated independently or ganged together in a common fixture. When multiple tools are employed the tools may be supported by plates incorporating a plurality of close-fitting holes suitably positioned to receive the tools. Also the fabric layer may be supported on a similar, hole-containing, tool receiving plate or on a fiber array oriented parallel to the tool or on a support body which may be penetrated by the tool without damage to the tool, such as a solid or foam soft rubber body.

Although a common embodiment employs fiber capturing features oriented to enable fiber capture during only one of the up-down strokes of a reciprocating tool, tool variants suitable for fiber capture on both of the up and down strokes may be employed.

The strength of a joint formed between layers in a layered one-piece reinforcement will depend, primarily on the number of fibers of each layer which interferingly engage with the fibers of the abutting layer and so will generally depend on the number of tool strokes. If fiber-engaging features are distributed along the length of the tool, the extent of fiber engagement and interference may also depend on the length of the tool stroke. Commonly such needle punch or similar procedures may be applied from only a single side so that the tool will always enter the layer stack on a particular surface of a particular layer. But, to achieve more robust fiber intermingling, the procedure may also be applied from both sides of the stack. Where such two-side needle punching is preferred it may be carried out either by using two sets of opposing tools or by using a single tool set from one direction and then interchanging the top and bottom surfaces of the stack and performing a second needle punching operation.

Such a one-piece reinforcement is effective in imparting increased strength and fracture resistance to a reinforced polymer article. Most reinforced polymer components are substantially two-dimensional in character with a thickness appreciably less than their lateral extent. Planar reinforcements are usually oriented to enhance lateral properties and are assembled one atop the other without interconnection. After impregnating the layers with a polymer resin and curing of the composite, the layers are secured to one another by only whatever thickness of polymer is trapped between them. Under high impact loads, if the polymer fractures or releases from one or other of the layers, delamination or separation of the reinforcement layers may occur. Once delaminated the layers are rendered incapable of providing mutual support and act independently, diminishing their effectiveness.

With the one-piece reinforcement of the present invention, fibers from one layer may be inserted into at least an adjacent layer so that these fibers serve as reinforcements which extend between and span layers. These inserted fibers will be oriented out of the plane of the reinforcing layers, commonly, but without limitation, within ±10° of perpendicular to the layer interface, and, after curing, secured in position by adhesion between the fibers and the polymer. Further, these fibers, in contrast to the fibers in the reinforcement layers, will follow a tortuous path which will be effective in resisting fiber pull-out from the polymer matrix. With the inter-layer reinforcement contributed by these layer-spanning fibers, the reinforcement will be less likely to delaminate under severe loads and so may provide enhanced performance over assemblies of reinforcing layers without such layer-spanning interlocking fibers.

The fiber content of such a one-piece reinforcement may include all commonly-used reinforcing fibers including, but not limited to, carbon fibers or glass fibers, as well as aramid fibers.

A fiber reinforced polymer article containing such a one-piece reinforcement may be fabricated by the following steps (though, depending on the particular molding process used, not necessarily in this order): assembling a layered reinforcement by stacking a plurality of generally planar, generally coextensive fiber-containing reinforcements atop one another in face to face relation; conveying a preselected portion of the fibers from at least one layer of the layered reinforcements out of the plane of the reinforcement and pulling or pushing them into to at least a second layer of reinforcement to secure the reinforcements together and repeating until all layers are bound to one another; impregnating the reinforcement with a suitable polymer precursor in sufficient quantity to wet all of the fibers and to fill a mold cavity; shaping the polymer precursor-impregnated reinforcement to a preselected geometry suitable for production of the article and thereby forming a pre-preg; placing the pre-preg in a mold with an interior cavity defining the desired article shape; closing the mold to induce the prepreg to conform to the shape of the die cavity, to compact the prepreg and to displace and distribute polymer precursor throughout the mold cavity; and curing the polymer precursor in the shaped pre-preg to form the fiber reinforced polymer article. One-sided vacuum-bag or autoclave molding may also be employed.

These and other aspects of the invention are described below, while still others will be readily apparent to those skilled in the art based on the descriptions provided in this specification.

BRIEF DESCRIPTION OF THE DRAWINGS

FIG. 1 shows, a schematic representation of a number of aligned and random reinforcements suitable for reinforcing a reinforced polymer article.

FIGS. 2A-G show, in cross-section, a series of schematic representations of a needle-punch tool entering and withdrawing from a 3-layer reinforcement with two aligned fiber outer layers and a random fiber inner layer. The tool is adapted to capture a fiber on removal from the reinforcement.

FIGS. 3A-F show, in cross-section, a series of schematic representations of a needle-punch tool entering and withdrawing from a three layer reinforcement with two aligned fiber outer layers and a random fiber inner layer. The tool is adapted to capture a fiber on entering the reinforcement.

FIGS. 4A-B shows, schematic illustrations of two bi-directional needle punch tools adapted to capture fibers on both entering and withdrawing from a fibrous body.

DESCRIPTION OF PREFERRED EMBODIMENTS

Fiber reinforced polymer composite articles find increasing application where low mass and high strength are required. Often the composite reinforcement is itself a composite of several different, generally coextensive reinforcing fiber layers stacked or layered atop one another. The reinforcements may be aligned woven or non-woven fibers, or randomly arranged and positioned fibers which may be continuous, or chopped. Illustrative examples of such reinforcements are shown in FIGS. 1A-D and may comprise without limitation, carbon fibers, glass fibers, and aramid fibers.

Figure 1A:
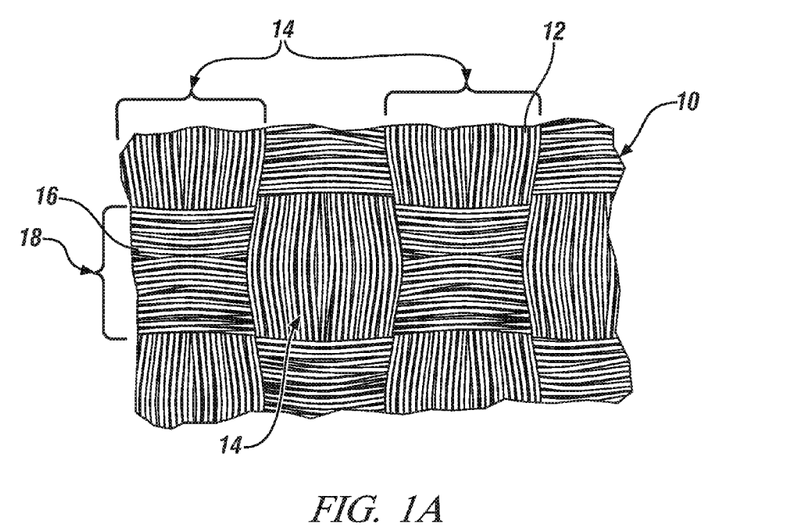
FIG. 1A shows, in plan view, a woven reinforcement.
Figure 1B:
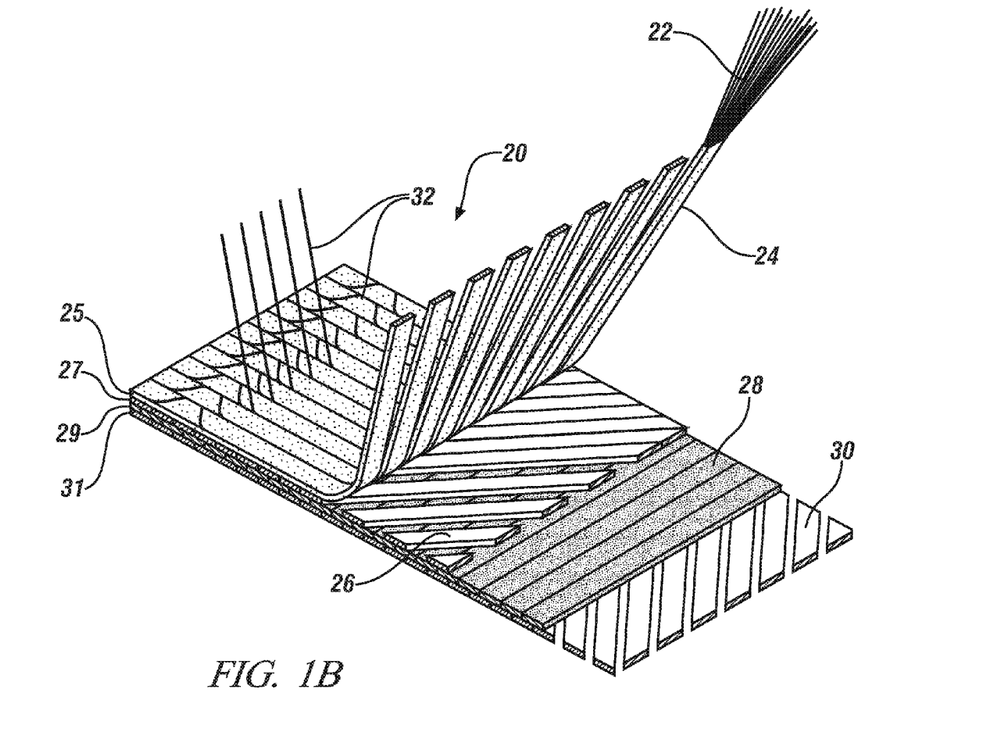
FIG. 1B shows in perspective view, a non-woven reinforcement.

FIG. 1A shows a portion of a woven reinforcement 10 comprising warp fibers 12 arranged into tows 14 which alternately overlie and underlie weft fibers 16 arranged into tow(s) 18. FIG. 1B shows a four layer non-crimp fabric (NCF) 20 in which roving layers 25, 27, 29, 31 containing oriented spaced-apart roving 24, 26, 28, 30 each containing fibers 22 (shown only once for clarity) are laid down in layered fashion and secured by tricot stitching 32.

Figure 1C:
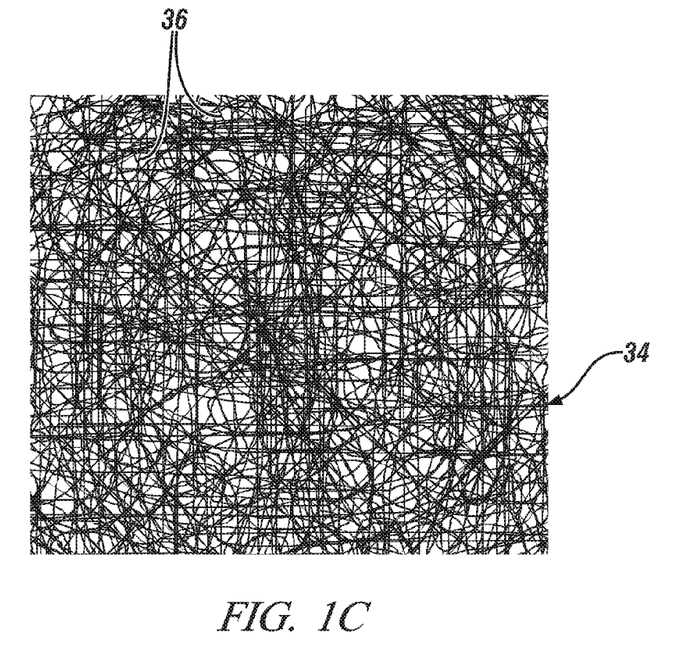
FIG. 1C shows, in plan view, a continuous mat reinforcement.
Figure 1D:
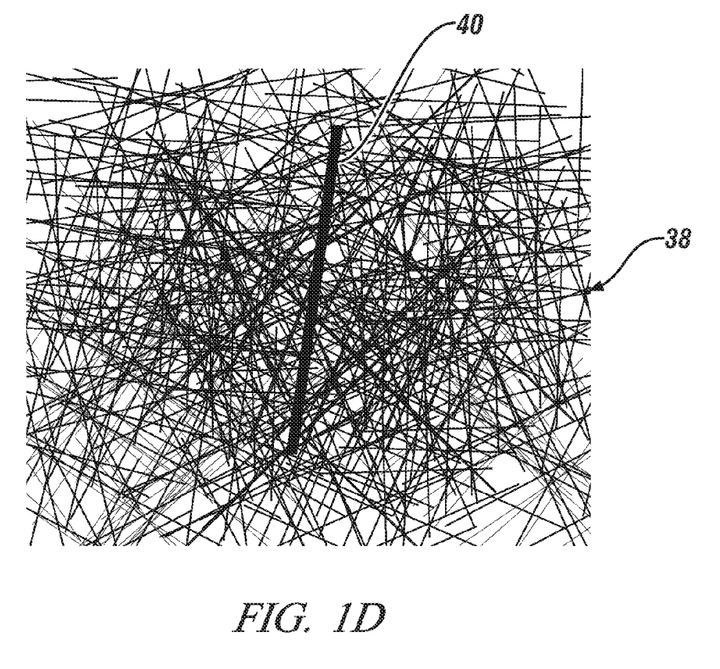
FIG. 1D shows in plan view a chopped mat reinforcement.

FIG. 1C shows a random continuous fiber mat 34 in which a plurality of continuous fibers 36, have been laid down in a generally random manner in a generally planar, but layered configuration. FIG. 1D shows a random chopped fiber mat 38 in which lengths of chopped fiber, for example fiber 40 (shown in heavier weight line for clarity) have been randomly arranged to form a generally planar, but layered, array. It will be appreciated that although the fiber density shown in both of FIGS. 1C and 1D is relatively low for ease of viewing, typical fiber mats may have many more overlying fibers and may have appreciable thickness.

FIGS. 2A-G show how a group of three discrete and initially unattached fiber reinforcing layers, 50, 52, 54 may be secured into a one-piece reinforcement by the action of tool 56 with fiber engaging feature 58. Reinforcing layers 50, 54 are aligned fiber reinforcement layers, here depicted, without limitation or restriction, as four-layer stackups of aligned reinforcing fiber rovings similar to the NCF shown in FIG. 1B. Reinforcing layers 50 and 52 could equally be NCF fabrics with fewer or greater layers of woven fabrics without limitation. Without limitation, reinforcing layer 52 is shown as a random fiber layer similar to either of the continuous fiber or chopped fiber mats shown in FIGS. 1C and 1D.

Figure 2:
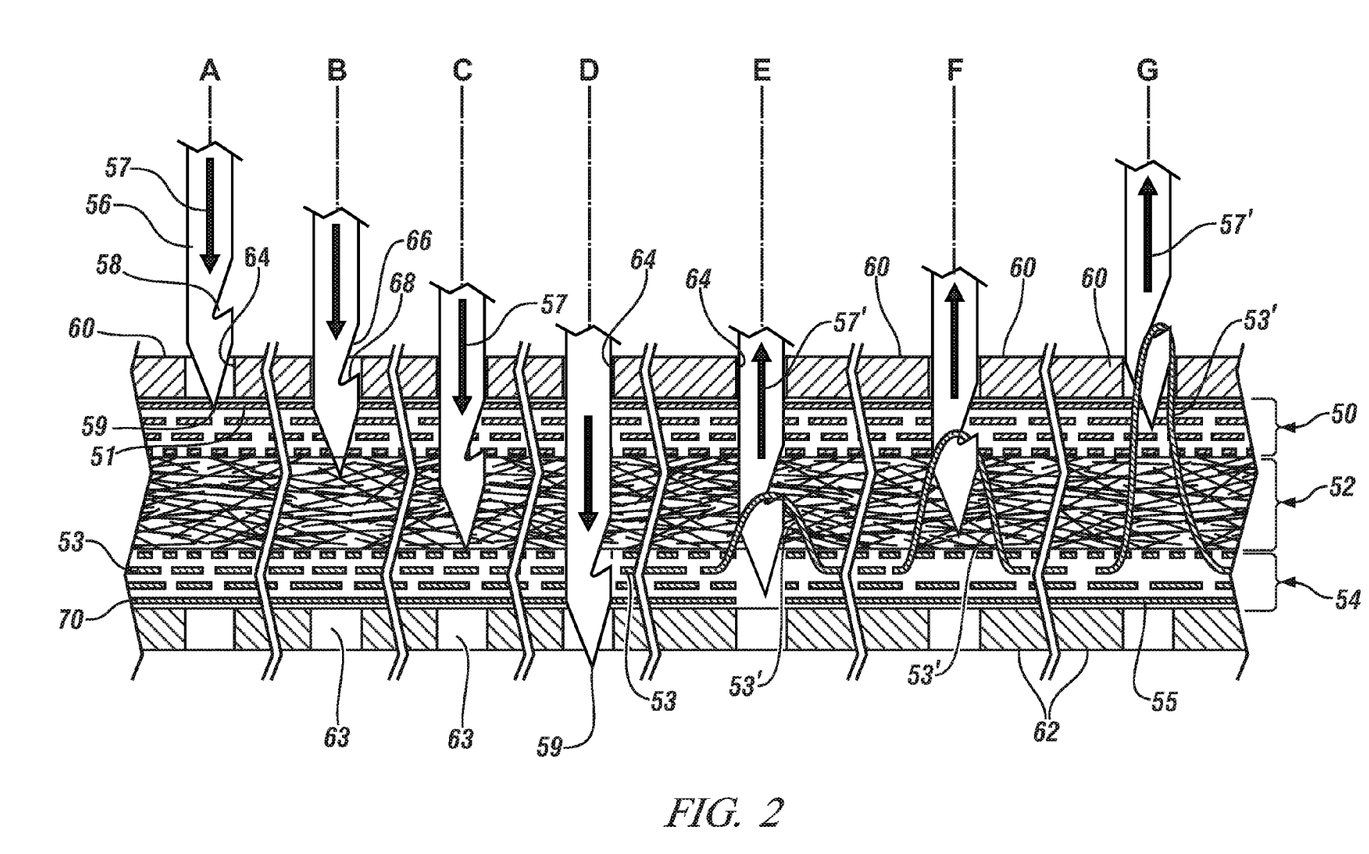

In FIG. 2A, point 59 of tool 56, moving as indicated by arrow 57 and guided by opening 64 in top plate 60 just penetrates the upper fiber layer 51 of aligned fiber reinforcement 50. Continued motion of tool 56, shown at FIGS. 2B-D progressively drives tool 56 through, successively, reinforcing layers 50, 52 and 54, until, as shown at FIG. 2D, tool point 59 emerges from lower fiber layer 55 of aligned fiber reinforcement 54 and just engages opening 63 in lower support 62. Throughout tool advance, no fiber capture occurs because capture surface 68 and guidance surface 66 which together define fiber capture feature 58 are not arranged to engage and capture any of the fibers encountered by tool 56 as it advanced in the direction of arrow 57. At FIG. 2E, after point 59 has penetrated lower aligned fiber reinforcement 70, the direction of motion of tool 56 has reversed and is now indicated by arrow 57', enabling capture surface 68 to engage with fibers from roving layer 53 of lower aligned reinforcement 70, or, as shown, all of roving layer 53 to form and carry roving loop 53' upward through reinforcing layers 52 and 50 as shown in FIGS. 2F and 2G. Continued motion of tool 56 in direction of arrow 57' will fully disengage tool 56 from opening 64 in upper plate 60 so that by relaxing tension on loop 53' to disengage tool capture surface 68 from loop 53', tool 56 may be moved laterally to fully disengage loop 53' from capture feature 58 so that the process may be repeated. Loop 53' remains in the position shown in FIG. 2G, inserted into, and engaging, reinforcement layers 52 and 50.

The direction of motion of tool 56 has been shown as generally perpendicular to the plane of the fiber reinforcements. This is not intended to limit the invention which also comprehends the use of inclined or slanted tools. It will be appreciated that any inclination of the tool will also be manifested in the orientation of the fiber loop(s).

FIGS. 3A-F show, in an alternate embodiment, how a similar group of three discrete and initially unattached fiber reinforcing layers, 150, 152, 154 may be secured into a one-piece reinforcement by the action of tool 156 with fiber engaging feature 158. Similarly to FIGS. 2A-G, reinforcing layers 150, 154 are aligned fiber reinforcement layers, with four-layer stackups of aligned reinforcing fiber rovings similar to the NCF shown in FIG. 1B. Reinforcing layer 152 is shown as a random fiber layer similar to either of the continuous fiber or chopped fiber mats shown in FIGS. 1C and 1D.

The particular number, arrangement and character (aligned or random fiber; woven or non-woven; number of fibers or plies per layer) of the layers shown in FIGS. 3A-F are exemplary only and no limitation of the scope of the invention is intended or should be inferred from the particular reinforcing layer arrangement shown.

Figure 3:
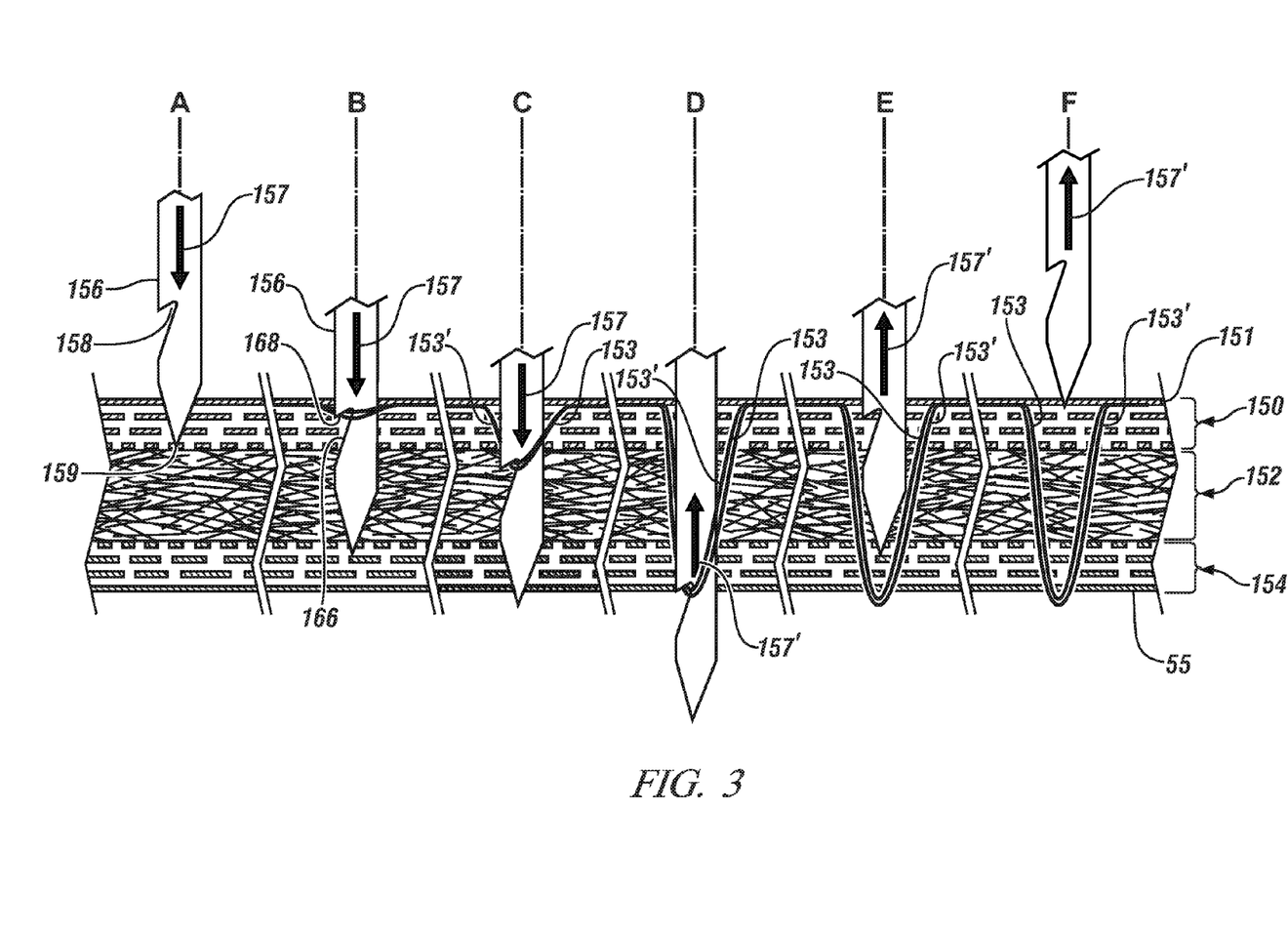

In FIG. 3A, point 159 of tool 156 moving in a direction 157 is shown penetrating several of plies of reinforcing layer 150 while fiber capture feature 158 has not yet engaged the upper ply 151 of layer 150. Tool 156 may, like tool 56 shown in FIGS. 2A-G, be supported by openings in a top plate and by openings in a lower support like those shown as 64 in (top) plate 60 and openings 63 in (lower) support 62 in FIGS. 2A-G. These features have been omitted from FIGS. 3A-F for clarity. At FIG. 3B tool 156 has further advanced in the direction of arrow 157 so that capture surface 168 of fiber capture feature 158 has engaged a fiber loop 153 from reinforcing layer 151 of reinforcement 150. Fiber loop 153 is guided into contact with capture surface 168 by guidance surface 166. With continued advance in direction of arrow 157, shown at FIG. 3C, tool 156 penetrates deeper into the reinforcement stack defined by reinforcement layers 150, 152 and 154 engaging a second thread loop 153' originating in ply 151' of layer 150. At FIG. 3D, fiber loops 153 and 153' have been pulled out of the plane of layer 150 and extended through the reinforcement stack and below ply 155 of layer 154. In so doing, fiber loops 153 and 153' bridge the interfaces between layers 150 and 152 as well as between layers 152 and 154. Fiber loops 153 and 153' are directed generally perpendicular to the plane of layer 151. As tool 156 is withdrawn in the direction of arrow 157' (FIGS. 3D-F), displaced fiber loops 153 and 153', now inserted into reinforcing layers 152, 154 are frictionally and interferingly engaged by the fibers of reinforcing layers 154 and 152. The frictional restrain applied to loops 153 and 153' causes them to disengage from fiber capture feature 158 and remain in their displaced configuration. Tool 156 may be laterally displaced and re-inserted into the reinforcement stack to repeat this process until a suitable and predetermined number of fibers has been inserted into adjacent reinforcing layer(s).

Repeated application of the processes shown in FIGS. 2A-G and 3A-F will result in a plurality of fibers or fiber tows or roving which will extend through the thickness of the reinforcement stackup. These fibers, through frictional engagement with other fibers in the stackup and/or through mechanical interference with other fibers in the stackup will induce sufficient cohesion between the reinforcement layers to render a one-piece reinforcement. The processes shown in FIGS. 2A-G and 3A-F are intended to illustrate the interaction between an individual tool and the individual layers. To obtain a generally uniform areal density of fibers or tows extending through the layers, an individual tool may be repeatedly inserted and removed while following a path which traverses substantially the entire area of the reinforcement. A second approach, suitable for reinforcements of more limited area, is to employ a plurality of tools, suitably positioned on a common support or fixture, so that all of the tools may be inserted and extracted in concert. A combined approach may be adopted for more extensive reinforcements. A multi-tool fixture may be repeatedly employed and stepped over substantially the entire area of the support until a suitable, and suitably uniform, density of fibers or tows extending through the layers is obtained.

Both top plate 60 and lower support 62 have been shown as sheet-like or plate-like bodies with openings positioned to accept reciprocating tool 56. Top plate 60 serves to guide and support tool 56 which may, if cylindrical in cross-section have a diameter of less than 0.5 millimeters or so and may break or bend if not supported. But lower plate 62 serves to support the workpiece and ensure that tool 56 is driven into the workpiece rather than bodily displacing it. Alternate designs of lower support 62 may be employed. For example the lower support may be a solid or porous body, capable of penetration by tool 56, which does not appreciably dull tool point 59, such as rubber or rubber foam. Alternatively an array of (relatively) widely spaced upwardly pointing fibers or thin columns may be used. With this design the fibers or columns may be present in sufficient number and density to support the workpiece but suitably positioned and spaced apart to at least minimize the possibility of contact between a descending tool and the support columns. In a related design the support columns may be made compliant so that any tool-support contact on tool advance merely deflects or moves the support aside temporarily, enabling to return to its undeflected configuration as the tool is withdrawn.

Figure 4A:
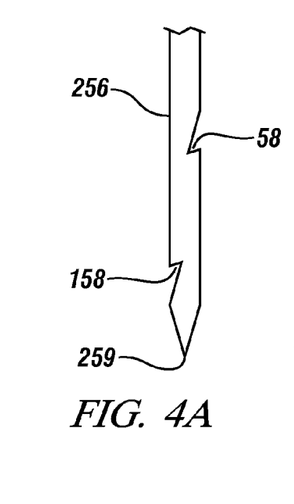

Because the fiber-capturing action of the tools shown in FIGS. 2A-G and 3A-F occurs at different stages of the stroke a bi-directional tool, incorporating both fiber capturing features 58 and 158 may be employed. A representative tool 256 is shown in FIG. 4A and includes both of fiber capturing features 58 and 158. In operation, fiber capturing tool 158, closer to tool point 259, will engage the upper surface of a reinforcement stack first and begin to convey fibers from the upper surface view of the stack to the lower surface. As tool 256 advances deeper into the stack, fiber capture feature 58 will be immersed in the stack but, due to its orientation will be unable to engage with or capture any fibers. When the tool reaches the limit of its advance stroke and begins to retract, fiber capture feature 158 will release those fibers which it was conveying and fiber capture feature 58 will capture fibers and begin to convey them toward the upper surface. The stroke of the tool and the placement of the fiber capturing features on the tool, in conjunction with the thickness of the reinforcement stack will determine the origin and extent of the fiber loops. Generally however it is preferred that the loops extend through the entire thickness of the stack for greatest cohesion across all layers.

Figure 4B:
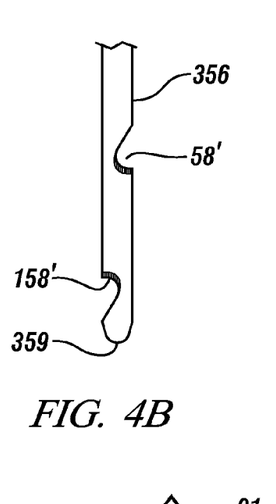

FIG. 4B illustrates a second configuration for such a tool. It will be appreciated that, to be effective a tool should induce as little damage to the fibers and fiber breakage as possible and for this reason a tool with a small cross-section of say between about 0.5 and 1 millimeter is preferred. But tool geometry will also influence the likelihood of fiber damage from the tool. The angular nature of the tool point 259 and fiber capture features 58, 158 shown in FIG. 4A may create stress concentrations or otherwise cut or damage fibers. In FIG. 4B, tool 356 is shown with rounded end 359 which may be effective in laterally displacing fibers to enable insertion and passage of tool 356 rather than potentially cutting or otherwise weakening fibers with pointed end 259. Similarly fiber capture features 58' and 158', though still suited to capture and retain fibers, are shown as having a more rounded, or curved appearance, in both directions to minimize stress concentrations and promote fiber conveyance with minimal damage.

Figure 5A:
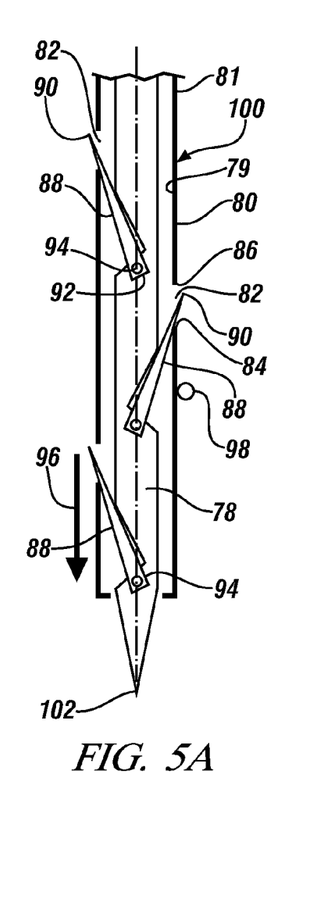
FIGS. 5A-C shows, in cross-section, the operation of a reconfigurable needle punch tool in which the fiber capture feature may be: retracted—FIG. 5A; oriented to capture fibers—FIG. 5B; and oriented to disengage fibers—FIG. 5C.

The tool designs shown have exhibited a fixed geometry and relied on the directionality of the fiber capture process to disengage the tool from the fiber when fiber conveyance is terminated, generally when the fibers from one layer have been pulled or pushed through and inserted into at least a second layer. FIGS. 5A-D shows an illustration of a variable geometry tool which may also be effective in conveying fibers through and across layers but may be more effective in minimizing the potential for fiber damage.

Figure 5B:
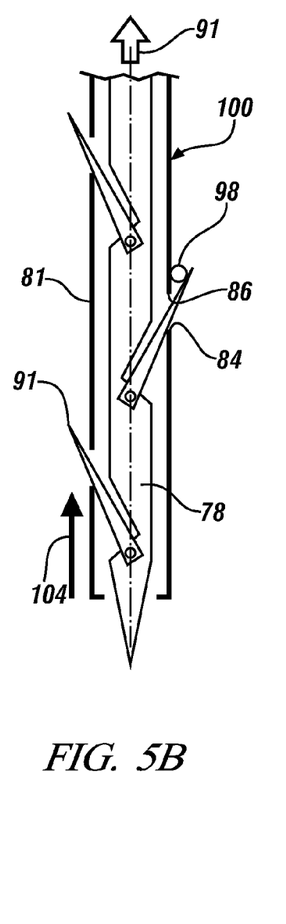

The tool 100, shown, at FIG. 5A in a configuration suitable for penetrating a workpiece consists of a generally cylindrical pin 78 slidably restrained within the inner surface 79 of a hollow cylindrical casing 80. A plurality of fiber capturing features 88 are pivotally pinned, near extremity 92, to cylindrical pin 78 at pivots 94 and engage one of a like plurality of openings 82 in casing 80. The relative positions of pivot 94, attached to pin 78, and opening 82, located in casing 80 determine the orientation of fiber capturing feature 88. Changing the relative positioning of pivots and openings by moving pin 78 relative to casing 80 enables generally simultaneous adjustment of the orientations of all of the fiber capturing features 86 as shown in FIGS. 5A and 5B. In FIG. 5A, pin 78 and casing 80 are so arranged that fiber capturing features 88, are supported on pin 94 on one end, and on lower edge 84 of opening 82, near its other extremity 90. Thus fiber capturing features 88 are near fully retracted into casing 80 so that only a portion extends beyond casing 80. In such configuration tool 100 may be directed into a workpiece in direction of arrow 96 with little likelihood of imparting damage to a workpiece fiber 98 in contact with casing exterior surface 81 from fiber capturing features 88.

In FIG. 5B the direction of tool 100 motion is reversed as indicated by arrow 104. Also pin 78 has been displaced, relative to casing 80, in the direction of arrow 91 and so likewise displacing fiber capturing feature 88 in the direction of arrow 91. Because of its engagement with opening 82, feature 88 will be guided by upper opening edge 86 or by lower opening edge 84 so it rotates outboard and into a more suitable fiber capturing orientation as well as extending so that extremity 90 of feature 88 protrudes beyond outer surface 81 of casing 80. In this configuration, features 88 are well-suited to engage any fibers 98 adjacent to outer casing surface 81 as shown at FIG. 5B.

Figure 5C:
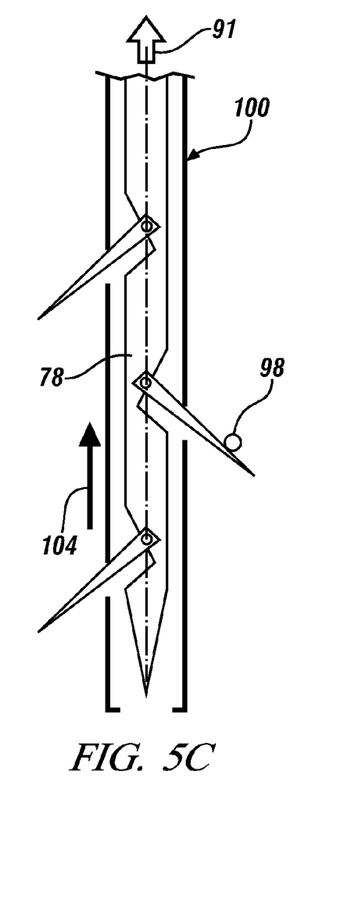

Yet further relative motion of pin 78 with respect to casing 80 as shown at FIG. 5C may result in further extension of fiber capturing feature 88 and also in its further rotation to an orientation in which it is not properly inclined to capture and retain fibers. In this configuration fiber 98, upon continued motion of tool 100 in the direction of arrow 104, fiber 98 may 'roll off' and disengage from feature 88. Resetting tool 100 to the configuration of FIG. 5A by moving pin 78, with respect to casing 80, in a direction opposite that of arrow 90 enables the cycle to be repeated. Depending on the angular range of motion of fiber capturing feature 88, it may be feasible to have it operate bidirectionally. With only modest further rotation, fiber capturing feature 88 may be oriented to capture fibers if the direction of motion of tool 100 is reversed. Thus tool 100 may be operated unidirectionally or bidirectionally.

Figure 5D:
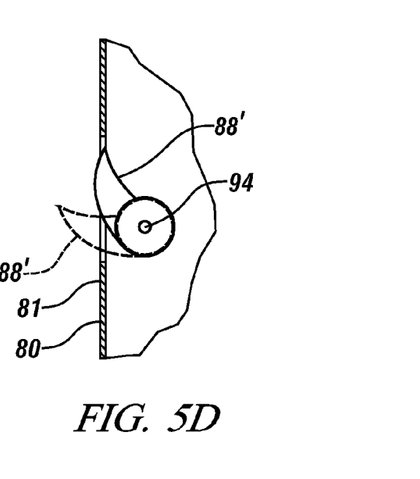
FIG. 5D shows, in fragmentary cross-section, an alternative fiber capture feature design.

Fiber damage may be further minimized through the use of a more smoothly curved fiber capture feature such as the 'comma-shaped' design 88' shown, in fragmentary view, in both retracted (solid line) and extended (broken line) configuration in FIG. 5D.

Figure 6:
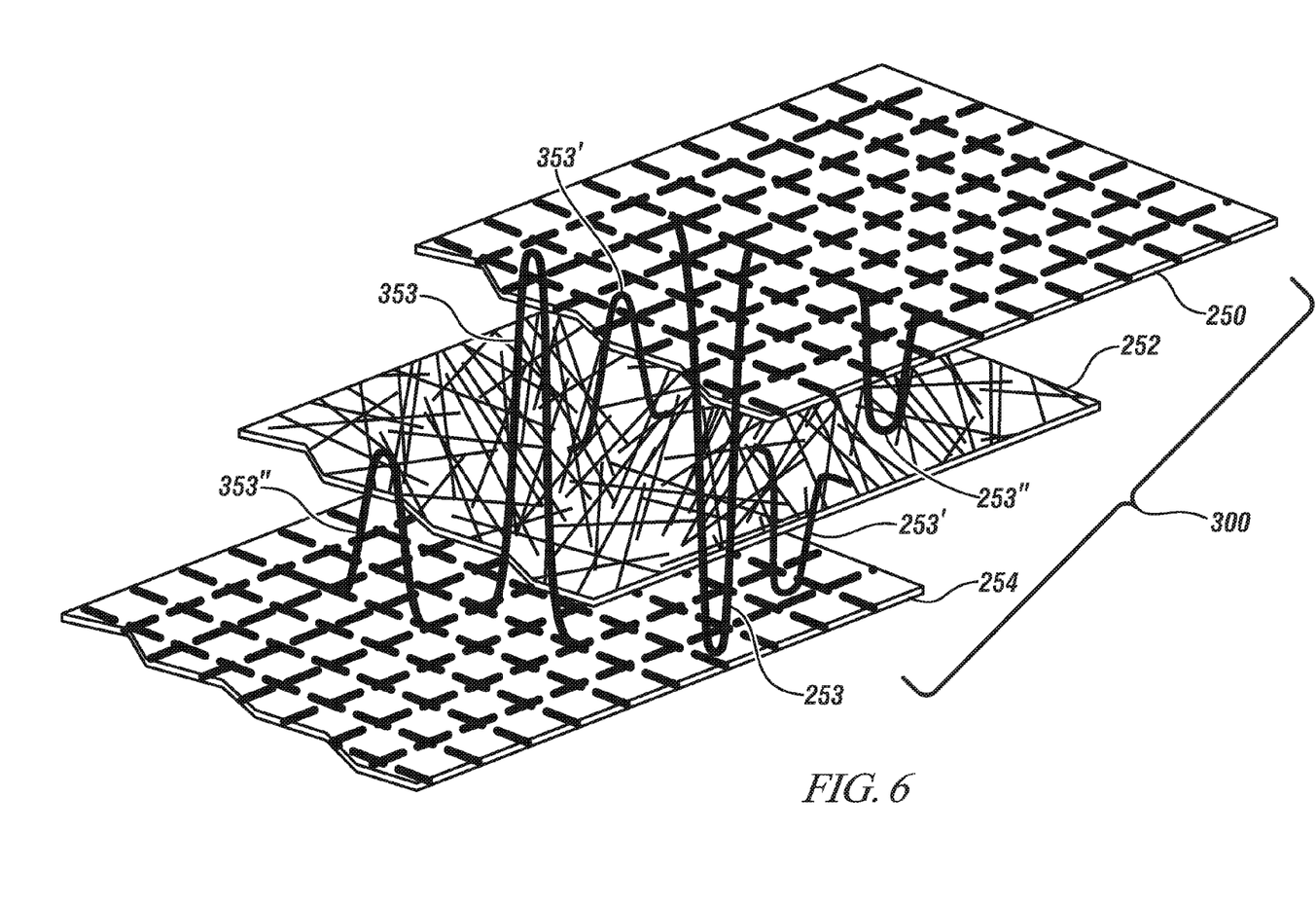
FIG. 6 shows, in quasi-perspective view a three-layer reinforcement stack with fiber loops extending though the layers to interlock and bind the layers together.

FIG. 6 shows a depiction of a one-piece layered reinforcement in quasi-perspective view. A three-layer stack 300 comprises reinforcing layers 250, 252 and 254 represented as woven fiber layers, 250, 254 and chopped fiber mat layer 252. These layers are interlocked and bound together by a plurality (not shown) of fiber loops which may include one or more of the individual representative loop configuration 253, 353, 253', 353', 253", 353", all shown in heavy line for clarity. Loop 353, extending from woven layer 254, passes through and is inserted between the fibers of layer 252 and is further inserted into the woven fibers of layer 250. Loop 253, extending from woven layer 250, passes through and is inserted between the fibers of layer 252 and is further inserted into the woven fibers of layer 254. Less extensive loops 253' and 353' originate in random fiber layer 252 and are inserted into woven fiber layers 250 and 254 respectively, while loops 253" and 353", originating in woven fiber layers 250 and 254 respectively extend only partway through the stack and are inserted into random layer 252. The representation shown in FIG. 6 is illustrative and not limiting. For example, other fiber layer configurations may be employed and such alternate fiber layer configurations may enable other loop configurations than those shown. Also and not all possible loop configurations may be found in a specific reinforcement.

A fiber reinforced polymer article containing such a one-piece reinforcement may be fabricated by the following steps, which need not necessarily be performed in the order listed—in particular, it may be preferred to charge the reinforcement with polymer precursor after the reinforcement has been placed in a mold: assembling a layered reinforcement by stacking a plurality of generally planar, generally coextensive fiber-containing reinforcements atop one another in face to face relation; conveying a preselected portion of the fibers from at least one layer of the layered reinforcements out of the plane of the reinforcement and pulling or pushing them out of the plane of the layer across at least one layer boundary to insert the fibers into at least a second layer of reinforcement to secure the reinforcement layers together; and repeating until all layers are bound to one another by fibers extending from one layer and engaging with at least an adjacent layer; impregnating the reinforcement with a suitable polymer precursor in sufficient quantity to wet all of the fibers and to fill a mold cavity; shaping the polymer precursor-impregnated reinforcement to a preselected geometry suitable for production of the article and thereby forming a pre-preg; placing the pre-preg in a mold with an interior cavity defining the desired article shape; closing the mold to induce the prepreg to conform to the shape of the die cavity, to compact the prepreg and to displace and distribute polymer precursor throughout the mold cavity; and curing the polymer precursor in the shaped pre-preg to form the fiber reinforced polymer article.

One-sided vacuum-bag or autoclave molding may also be employed. In this case the pre-preg may be positioned in one-half of a mold cavity and pressure applied to induce the pre-preg to conform to the mold shape.

The practice of the invention has been illustrated through reference to certain preferred embodiments that are intended to be exemplary and not limiting. The full scope of the invention is to be defined and limited only by the following claims.

The invention claimed is:

1. A one-piece fiber reinforcement for a reinforced polymer article formed from a plurality of stacked, separate and distinct, reinforcing fibrous structures arranged in layers, the layers being at least partially coextensive and in face-to-face contact, the one-piece fiber reinforcement comprising:
    a fiber layer reinforcing structure with an area and a thickness and comprising aligned fibers which are either woven or stitched together, for placement of the aligned fiber layer in contacting face-to-face relation with a second fiber layer reinforcing structure having a thickness and an area and comprising a mat of randomly oriented fibers, at least a portion of the mat fiber layer area being placed coextensively with at least a portion of the area of the aligned fiber layer;
    a plurality of the aligned fibers of the aligned fiber layer reinforcing structure being extended out of the aligned fiber layer and inserted into the thickness of the mat fiber layer reinforcing structure to engage and interfere with at least some of the random fibers of the mat fiber layer so as to securely bind the mat fiber layer to the aligned fiber layer;
    the fibers extending out of the aligned fiber layer being distributed over the coextensive portions of the areas of the aligned and mat fiber layers to form a one-piece fiber reinforcement adapted for impregnation with a polymer or polymer precursor, before or after it is placed in a mold, for fabrication of a reinforced polymer article.

2. The one-piece fiber reinforcement of claim 1 in which the reinforcement further comprises an additional fiber layer reinforcing structure, the additional fiber layer reinforcing structure being a second aligned fiber layer having aligned fibers which are either woven or stitched together, and coextensive with the aligned fiber layer, the mat fiber layer being positioned between, and in contacting face-to-face relation with, the aligned fiber layer and the second aligned fiber layer, and further comprising fibers of the aligned fiber layer passing through the thickness of the mat fiber layer and being inserted into at least some of the aligned fibers of the second aligned fiber layer for engagement and interference with the fibers of the second aligned fiber layer.

3. The one-piece fiber reinforcement of claim 2 in which some of the aligned fibers of the second aligned fiber layer are passed through the thickness of the mat fiber layer and are inserted into at least some of the aligned fibers of the aligned fiber layer to engage and interfere with at least some of the aligned fibers of the aligned fiber layer.

4. The one-piece fiber reinforcement of claim 1 in which the aligned fiber layer is an aligned, multi-layer, non-crimp fabric.

5. The one-piece fiber reinforcement of claim 4 in which the aligned, multi-layer, non-crimp fabric comprises two layers in which the fibers are oriented at +45° and −45°.

6. The one-piece fiber reinforcement of claim 4 in which the aligned, multi-layer, non-crimp fabric comprises a 4-layer grouping of fibers arranged at 0°, +45°, −45° and 90° respectively with substantially equal numbers of fibers in each orientation.

7. The one-piece fiber reinforcement of claim 1 in which the fibers of each layer are one or more of the group consisting of carbon fibers, glass fibers and aramid fibers.

8. A fiber reinforced composite article comprising a polymer matrix reinforced by a one-piece fiber reinforcement comprising at least two, at least partially coextensive, discrete and distinct, fibrous, reinforcing, structure preform layers, each of the preform layers being placed in contacting face-to-face relationship with one or more neighboring preform layers at one or more interfaces, each preform layer comprising reinforcing fibers for placement of the layers;
    the preform layers of the one-piece reinforcement being securely bound to one another by conveying a plurality of fibers from at least a first preform layer out of the plane of the preform layer and across the one or more preform layer interfaces to insert them at least into all other preform layers so that the fibers of all other preform layers engage and interfere with the fibers of the first preform layer to interlock the layers.

9. The fiber reinforced composite article of claim 8 in which the layered one-piece fiber reinforcement comprises a first aligned fiber layer reinforcing structure preform, a second aligned fiber layer reinforcing structure preform and a third random fiber layer reinforcing structure preform positioned between the first and second aligned fiber layer preform wherein fibers from at least the first aligned fiber layer preform are conveyed into the second and third preform layers to interlock all three layers.

10. The fiber reinforced composite article of claim 8 in which the layered one-piece fiber reinforcement comprises a non-crimp fabric reinforcing structure preform comprising two layers in which the fibers are oriented at +45° and −45°.

11. The fiber reinforced composite article of claim 8 in which the fibers of the layered one-piece fiber reinforcement are one or more of the group consisting of carbon fibers, glass fibers and aramid fibers.

12. The one-piece fiber reinforcement of claim 8 in which the layered one-piece fiber reinforcement comprises an aligned, multi-layer, non-crimp fabric reinforcing structure preform comprising a 4-layer grouping of fibers arranged at 0°, +45°, −45° and 90° respectively with substantially equal numbers of fibers in each orientation.

* * * * *